(12) United States Patent
Zhang et al.

(10) Patent No.: US 11,161,556 B2
(45) Date of Patent: Nov. 2, 2021

(54) ACTIVE FRONT SPLITTER FOR AUTOMOBILE

(71) Applicants: Yanfeng Plastic Omnium Automotive Exterior Systems Co., Ltd., Shanghai (CN); Compagnie Plastic Omnium, Lyons (FR)

(72) Inventors: Chen Zhang, Shanghai (CN); Jie Xu, Shanghai (CN); Xiaogang Gui, Shanghai (CN); Miaotian Lin, Shanghai (CN)

(73) Assignees: YANFENG PLASTIC OMNIUM AUTOMOTIVE EXTERIOR SYSTEMS Co., Ltd., Shanghai (CN); COMPAGNIE PLASTIC OMNIUM, Lyons (FR)

( * ) Notice: Subject to any disclaimer, the term of this patent is extended or adjusted under 35 U.S.C. 154(b) by 66 days.

(21) Appl. No.: 16/677,765

(22) Filed: Nov. 8, 2019

(65) Prior Publication Data

US 2021/0070380 A1     Mar. 11, 2021

(30) Foreign Application Priority Data

Sep. 10, 2019   (CN) .......................... 201910854176.6
Sep. 10, 2019   (CN) .......................... 201921501221.1

(51) Int. Cl.
*B62D 35/00*     (2006.01)
*B62D 35/02*     (2006.01)

(52) U.S. Cl.
CPC ............ *B62D 35/005* (2013.01); *B62D 35/02* (2013.01)

(58) Field of Classification Search
CPC ....... B62D 35/005; B62D 35/02; B62D 37/02

USPC ................ 296/180.1, 180.2, 180.3
See application file for complete search history.

(56) References Cited

U.S. PATENT DOCUMENTS

| 6,286,893 B1* | 9/2001 | Presley ................ B62D 35/005 296/180.5 |
| 10,300,966 B2* | 5/2019 | Cha ......................... B62D 37/02 |
| 2009/0295190 A1* | 12/2009 | Kottenstette ......... B62D 35/005 296/180.3 |

(Continued)

FOREIGN PATENT DOCUMENTS

| DE | 10 2016 123 140 A1 | 6/2017 |
| DE | 10 2016 102 678 A1 | 8/2017 |

OTHER PUBLICATIONS

European Extended Search Report and Written Opinion dated Jun. 4, 2020 received in European Application No. 19 207 884.8.

*Primary Examiner* — Jason S Daniels
(74) *Attorney, Agent, or Firm* — Scully Scott Murphy & Presser

(57) ABSTRACT

An active front splitter for automobile is movably connected to a splitter support by a spindle support at each of its two ends. A driving mechanism being mounted to the splitter support at each of its two ends, an electric motor being mounted in the middle of the splitter support. The driving mechanism is driven by the electric motor and fixedly connected with the active front splitter so that the active front splitter is driven by the driving mechanism to rotate around a spindle fixed to the splitter support between a forwardly extended position and a retreated position. Thus, while ensuring the trafficability of the assembled automobile, it is possible to reduce wind drag so that the expected aerodynamic performance can be achieved.

9 Claims, 3 Drawing Sheets

(56) References Cited

U.S. PATENT DOCUMENTS

| | | | |
|---|---|---|---|
| 2015/0084369 A1* | 3/2015 | Niemi | B62D 37/02 |
| | | | 296/180.1 |
| 2015/0210325 A1 | 7/2015 | DeAngelis | |
| 2017/0106922 A1* | 4/2017 | Povinelli | B62D 35/02 |
| 2017/0120968 A1* | 5/2017 | Povinelli | B62D 35/02 |
| 2019/0002039 A1 | 1/2019 | Cha et al. | |
| 2020/0156715 A1* | 5/2020 | Andre | B62D 35/02 |
| 2020/0189668 A1* | 6/2020 | Urbach | B62D 35/005 |

* cited by examiner

ACTIVE FRONT SPLITTER FOR AUTOMOBILE

FIELD OF THE INVENTION

The invention relates to the field of automotive exterior parts, and more particularly, an active front splitter.

BACKGROUND OF THE INVENTION

Currently, environmental pollution has become more and more serious. National policies impose stricter environmental requirements, requiring automobiles to reduce the emission of $CO_2$. As consumers' costs of using automobiles increase, they also urgently hope to reduce energy consumption of automobiles. To achieve the above-described objectives, current solutions include: reducing the weight of an assembled automobile; reducing rolling resistance; developing electric automobiles. However, reducing the weight of an assembled automobile will affect its stability; reducing rolling resistance will increase the costs of tires; and electric automobiles have a limited range and rely on immature technologies.

A fixed-type splitter used in automobile has a certain capacity of improving aerodynamic performance. An automobile splitter reduces the amount of air entering the automobile by preventing air from entering its chassis. Thus, the pressure on the chassis is reduced, increasing the downforce of the automobile. Therefore, the wind drag can be effectively reduced. However, because of the trafficability requirements, the height of the splitter is limited, which causes poor results of the reduction of wind drag.

SUMMARY OF THE INVENTION

To solve the problem of limited splitter height in the prior art that causes poor results of wind drag reduction, the invention provides an active front splitter for automobile.

The active front splitter for automobile provided by the invention is rotatably connected to a splitter support by spindle supports fixed at its two ends. A driving mechanism of the active front splitter is mounted to each end of the splitter support. An electric motor is mounted in the middle of the splitter support. The driving mechanisms are driven by the electric motor and are fixedly connected with the active front splitter so that the active front splitter is driven by the driving mechanism to rotate around a spindle fixed to the splitter support between a forwardly extended position and a retreated position.

In an embodiment, the driving mechanism comprises a primary driving rod which is connected with the electric motor, a secondary driving rod fixed to the primary driving rod, a first connecting rod movably connected with the secondary driving rod and pivotally connected with the splitter support, and a second connecting rod pivotally connected with the first connecting rod and fixed to the active front splitter.

Thus, the spindle support defines the axis and radius of the rotation of the active front splitter, which is driven by the multiple rods transmission mechanism to move.

In an embodiment, one end of the first connecting rod is pivotally connected with the splitter support and the other end is hinged with the second connecting rod. In an embodiment, the secondary driving rod is provided with a slider, the first connecting rod is provided with a sliding slot in which the slider slides. With the rotation of the secondary driving rod, the slider slides in the sliding slot, which is for example an elongated slot along the first connecting rod, so as to rotate the first connecting rod relative to the splitter support.

In an embodiment, the active front splitter comprises an inner panel and an outer panel which is bonded to an external surface of the inner panel. In other embodiments, the active front splitter may only comprise a unique panel.

In an embodiment, an anti-wearing plate is screwed at each of the two ends of the splitter support.

In an embodiment, the electric motor is provided with a motor cover.

In an embodiment, the driving mechanism is provided with a sand prevention cover.

In an embodiment, when the active front splitter is in the forwardly extended position, the angle between the first connecting rod and the second connecting rod is 180° and the angle between the secondary driving rod and the first connecting rod is 90°. This embodiment is particularly interesting since the structure constituted here is self-locked when the active front splitter is subject to exterior force, such as high-speed wind force or impact of debris.

In an embodiment, when the active front splitter is in a retreated position, the angle between the first connecting rod and the second connecting rod is smaller than 90° and the secondary driving rod and the first connecting rod are substantially parallel to each other. In other words, the secondary driving rod, the first and second connecting rods are folded together and occupies a smaller space. The active front splitter is retreated rearward to a maximum extent.

The invention provides an active front splitter for automobile to remedy the drawback of a fixed-type splitter that it is unable to effectively reduce air drag. By means of the driving mechanisms that are driven by the electric motor, the active front splitter is able to rotate between two operating positions: forwardly extended position and retreated position. When the active front splitter is in the forwardly extended position, the ground clearance of the automobile is reduced, thus reducing the amount of air entering the automobile chassis, increasing the downforce, and thus reducing wind drag. When the active front splitter is in the retreated position, the ground clearance of the automobile is increased, in order to meet the trafficability requirements. Therefore, the invention is able to ensure the trafficability of assembled automobile while reducing the wind drag and thus achieving expected aerodynamic performance.

DETAILED DESCRIPTION OF THE EMBODIMENTS

The following provides preferred embodiments of the present invention with reference to the accompanying drawings and provides detailed descriptions.

Figure 1:
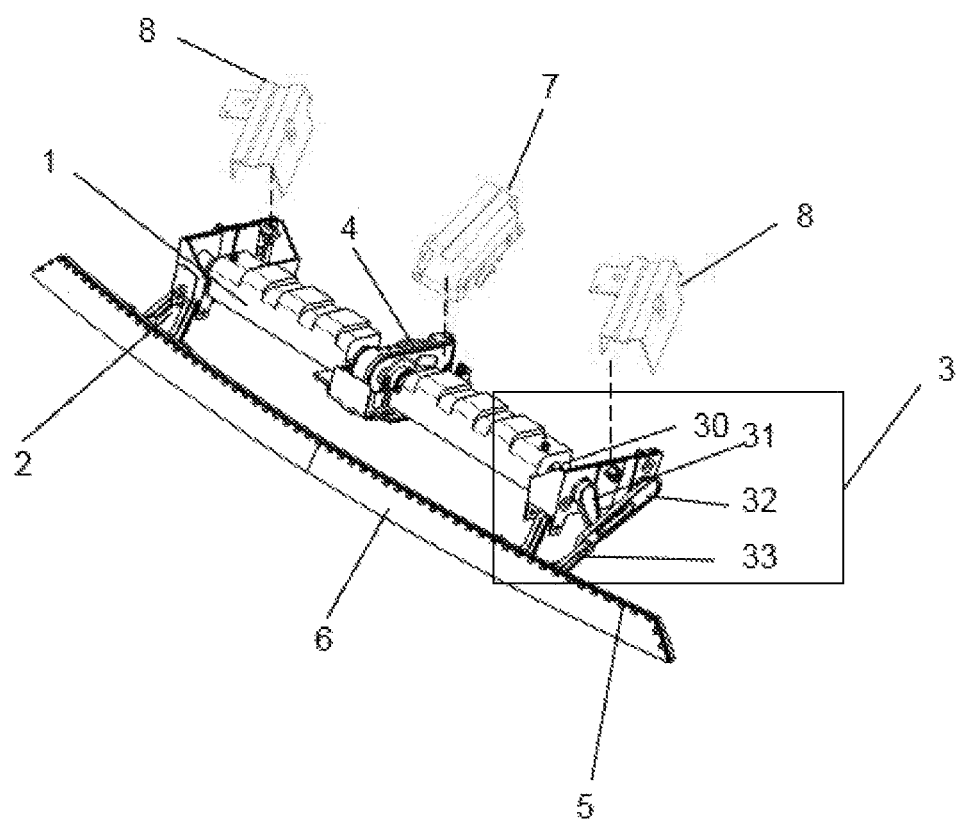
FIG. 1 is a schematic diagram of an active front splitter according to the invention.

As shown in FIG. 1, an active front splitter for automobile comprises a splitter support 1, a spindle support 2, a driving mechanism 3, an electric motor 4, an inner panel 5 of the front splitter, and an outer panel 6 of the front splitter. The splitter support 1 is provided with the driving mechanism 3 at each of its two ends, and the electric motor 4 at its middle. One end of the spindle supports 2 is hinged to the splitter support 1, and the other end of them is fixed to the inner panel 5 of the front splitter. The inner panel 5 and the outer panel 6 of the front splitter are bonded together by an adhesive tape.

The driving mechanism 3 comprises a primary driving rod 30, a secondary driving rod 31, a first connecting rod 32 and a second connecting rod 33. The primary driving rod 30 is mounted inside the splitter support 1, with one end connected to the electric motor 4, and the other end fixed with the secondary driving rod 31. One end of the first connecting rod 32 is pivotally connected with the splitter support 1. The other end of the first connecting rod 32 is pivotally connected with, for example hinged with, the second connecting rod 33 via a pivot 11, so that the second connecting rod 33 can rotate around the pivot 11. The other end of the second connecting rod 33 is fixed to the inner panel 5 of the front splitter. The first connecting rod 32 comprises a sliding slot 10 in the middle. In the illustrated embodiment, the sliding slot 10 is an elongated slot extending in the longitudinal direction of the first connecting rod 32. The secondary driving rod 31 comprises a slider 13. The slider 13 is able to slide inside the sliding slot 10.

The active front splitter according to the invention works as follows: the electric motor 4 drives the primary driving rod 30 to rotate, which in turn drives the secondary driving rod 31 to rotate. By means of the cooperation between the slider 13 carried by the secondary driving rod 31 and the sliding slot 10 in the first connecting rod 32, the first connecting rod 32 is driven to rotate around its pivot relative to the splitter support 1. The second connecting rod 33 is driven to move, thus driving the active front splitter to rotate around its spindle on the splitter support 1. When the automobile runs normally, the active front splitter is moved to the forwardly extended position. At this moment, the ground clearance of the automobile is reduced, thus reducing the amount of air entering the automobile's chassis, increasing the downforce thus reducing the wind drag. When encountering an obstacle or a rugged road surface, the active front splitter is moved to the retreated position. At this moment, the ground clearance of the automobile is increased so that the automobile can successfully pass.

Figure 2:
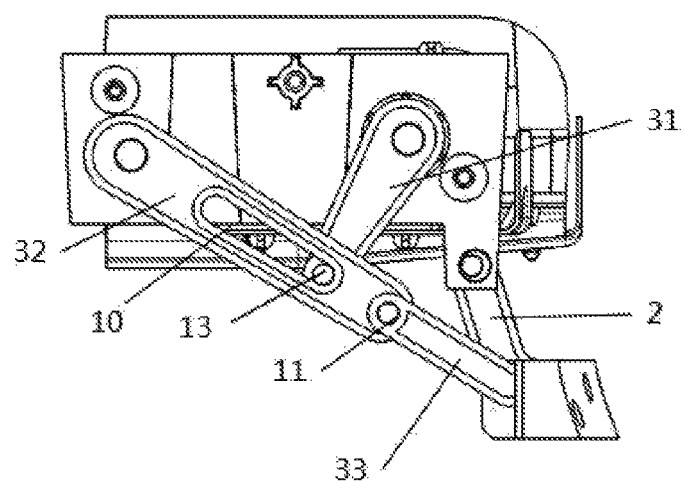
FIG. 2 is a schematic view of an active front splitter according to the invention in a forwardly extended position.

As shown in FIG. 2, when the angle between the first connecting rod 32 and the second connecting rod 33 is 180° and the angle between the secondary driving rod 31 and the first connecting rod 32 is 90°, the active front splitter is in the forwardly extended position. At this moment, the first and second connecting rods are aligned and the secondary driving rod 31 is perpendicular to this line, no rotation torque due to exterior force applied to the active front splitter 2 can be transmitted to the pivots. Thus, the driving mechanism 3 is in a self-locked state. Thanks to the locked state, the driving mechanism 3 can sustain relatively high wind pressure and impact forces of debris, thus improving the safety and stability of the mechanism.

Figure 3:
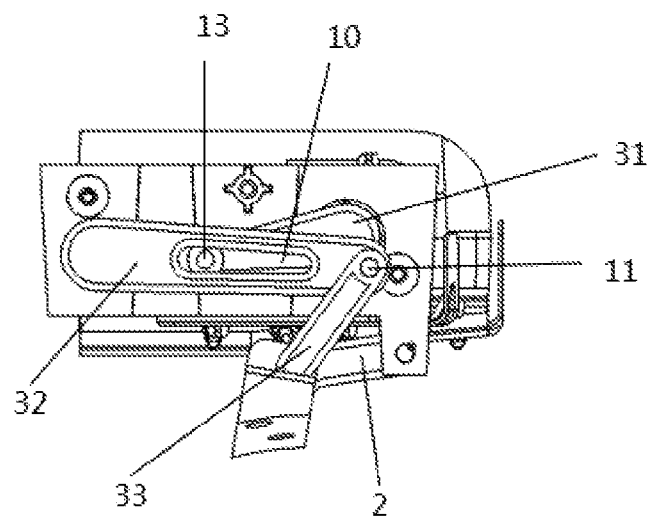
FIG. 3 is a schematic view of an active front splitter according to the invention in a retreated position.

As shown in FIG. 3, when the angle between the first connecting rod 32 and the second connecting rod 33 is smaller than 90° and the secondary driving rod 31 and the first connecting rod 32 are substantially parallel to each other, the active front splitter is in the retreated position. At this moment, the active front splitter has completely retreated. The trafficabiity requirements of the automobile are satisfied.

Considering the aesthetic requirements, the active front splitter of the present embodiment comprises an inner panel 5 and an outer panel 6 bonded together by an adhesive tape. Of course, it is also possible that the active front splitter according to the invention does not have an outer panel.

Figure 4:
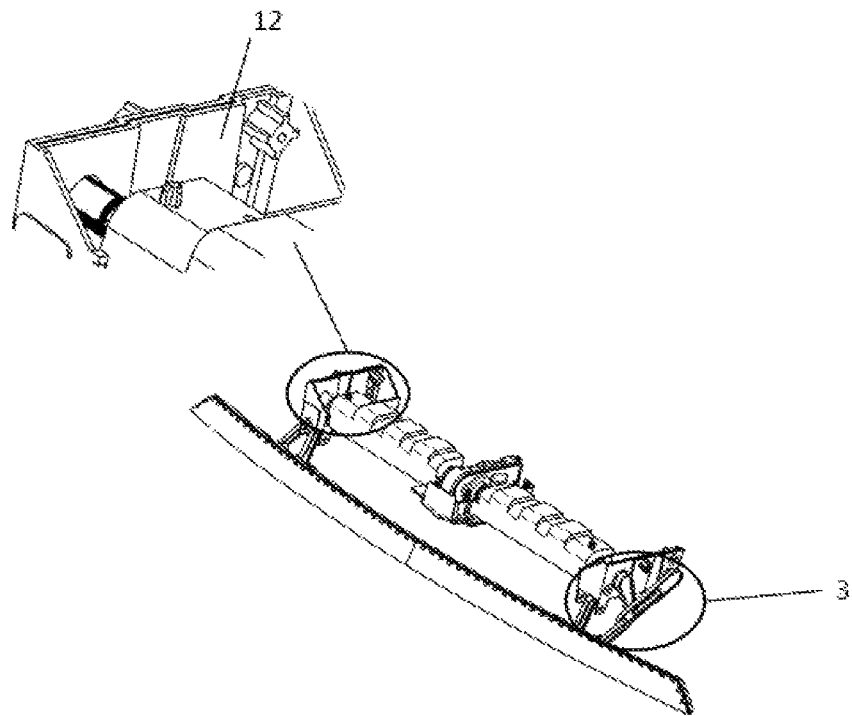
FIG. 4 is an assembled view of an active front splitter according to the invention and an anti-wearing plate.

In the present embodiment, the splitter support 1 is further provided with an anti-wearing plate 12. As shown in FIG. 4, the anti-wearing plate is mounted to the splitter support 1 by a screw and has a form that is easy to produce. It can enhance the endurance of the active front splitter and facilitate the production and assembly at the same time.

Figure 5:
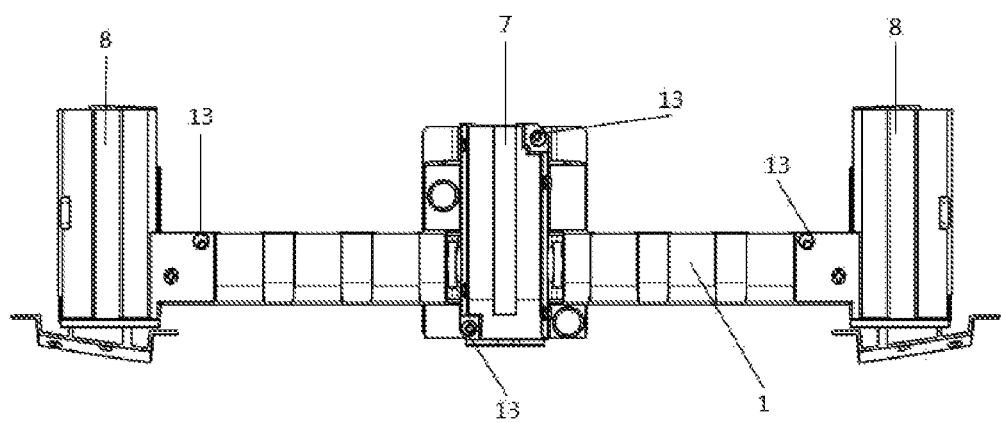
FIG. 5 is an assembled view of a sand prevention cover according to the invention and a motor cover.

In the present embodiment, as shown in FIG. 5, the electric motor 4 is provided with a motor cover 7, and each driving mechanism 3 is provided with a sand prevention cover 8. The covers are used for protecting, respectively, the electric motor and the driving mechanisms against impacts of debris. Therefore, the structure of the active front splitter is effectively protected during use. Both the active front splitter 1 and the electric motor 4 are provided with threaded holes 13, and the motor cover 7 and the sand prevention covers 8 are respectively mounted to the electric motor 4 and the driving mechanisms by screws.

The foregoing descriptions are merely preferred embodiments of the present invention and are not intended to limit the scope of the present invention. Various changes may be further made to the foregoing embodiments of the present invention. That is, a simple, equivalent change and modification made according to the claims of this application and the content of the specification of the present invention shall fall within the protection scope of the present invention. What is not described in detail in the present invention all belongs to common technologies.

The invention claimed is:

1. An active front splitter assembly for automobile, comprising:
   a front splitter,
   a splitter support, wherein the front splitter is rotatably connected to the splitter support by spindle supports fixed at two ends of the front splitter,
   a driving mechanism being mounted to each end of the splitter support, and
   an electric motor being mounted in the middle of the splitter support,
   wherein the driving mechanism is driven by the electric motor and fixedly connected with the front splitter, so that the front splitter is driven by the driving mechanism to rotate around a spindle fixed to the splitter support between a forwardly extended position and a retreated position,
   wherein the driving mechanism comprises:
   a primary driving rod connected with the electric motor;
   a secondary driving rod fixed to the primary driving rod;
   a first connecting rod moveably connected with the secondary driving rod and pivotally connected to the splitter support; and
   a second connecting rod pivotally connected to the first connecting rod and fixed to the front splitter.

2. The active front splitter assembly according to claim 1, wherein one end of the first connecting rod is pivotally connected with the splitter support and the other end is hinged with the second connecting rod.

3. The active front splitter assembly according to claim 1, wherein the secondary driving rod is provided with a slider, the first connecting rod is provided with a sliding slot in which the slider slides so as to rotate the first connecting rod relative to the splitter support.

4. The active front splitter assembly according to claim 1, wherein, when the front splitter is in the forwardly extended position, the angle between the first connecting rod and the second connecting rod is 180° and the angle between the secondary driving rod and the first connecting rod is 90°.

5. The active front splitter assembly according to claim 1, wherein, when the front splitter is in the retreated position, the angle between the first connecting rod and the second connecting rod is smaller than 90° and the secondary driving rod and the first connecting rod are substantially parallel to each other.

6. The active front splitter assembly according to claim 1, wherein the front splitter comprises an inner panel and an outer panel which is bonded to an external surface of the inner panel.

7. The active front splitter assembly according to claim 1, wherein an anti-wearing plate is screwed at each of the two ends of the splitter support.

8. The active front splitter assembly according to claim 1, wherein the electric motor is provided with a motor cover.

9. The active front splitter assembly according to claim 1, wherein the driving mechanism is provided with a sand prevention cover.

* * * * *

UNITED STATES PATENT AND TRADEMARK OFFICE
CERTIFICATE OF CORRECTION

| | | |
|---|---|---|
| PATENT NO. | : 11,161,556 B2 | Page 1 of 1 |
| APPLICATION NO. | : 16/677765 | |
| DATED | : November 2, 2021 | |
| INVENTOR(S) | : Chen Zhang | |

It is certified that error appears in the above-identified patent and that said Letters Patent is hereby corrected as shown below:

On the Title Page

Item (71) should read:
Yanfeng Plastic Omnium Automotive
Exterior Systems Co., Ltd., Shanghai
(CN); Compagnie Plastic Omnium,
Lyon (FR)

Item (73) should read:
Yanfeng Plastic Omnium Automotive
Exterior Systems Co., Ltd., Shanghai (CN);
Compagnie Plastic Omnium,
Lyon (FR)

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*